(12) United States Patent
Agarwal et al.

(10) Patent No.: US 7,250,072 B2
(45) Date of Patent: Jul. 31, 2007

(54) REMOVAL OF SULFUR-CONTAINING IMPURITIES FROM VOLATILE METAL HYDRIDES

(75) Inventors: Rajiv K. Agarwal, North Wales, PA (US); George L. Ryals, Newton, NJ (US); Wei Cao, Orefield, PA (US); John Frederick Cirucci, Schnecksville, PA (US); Robert W. Apollo, Swedesboro, NJ (US); Daniel McNesby, New Hope, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 519 days.

(21) Appl. No.: 10/717,050

(22) Filed: Nov. 19, 2003

(65) Prior Publication Data

US 2005/0106090 A1  May 19, 2005

(51) Int. Cl.
*C22B 4/08* (2006.01)
(52) U.S. Cl. .................... 75/710; 423/244.01
(58) Field of Classification Search ........ 423/138, 423/244.01; 75/710
See application file for complete search history.

(56) References Cited

U.S. PATENT DOCUMENTS

| | | | |
|---|---|---|---|
| 4,107,099 A * | 8/1978 | Hedge | 423/138 |
| 4,564,509 A | 1/1986 | Shealy et al. | |
| 4,565,677 A | 1/1986 | Yusa | |
| 4,983,363 A | 1/1991 | Tom et al. | |

FOREIGN PATENT DOCUMENTS

| | | |
|---|---|---|
| CS | 192 658 B-1 | 12/1978 |
| EP | 0839817 | 5/1998 |
| JP | 4 124001 | 4/1992 |
| JP | 7 267615 | 10/1995 |
| WO | WO 02/45846 | 6/2003 |

OTHER PUBLICATIONS

A.A. Efremov, et al, Absorption-Adsorption Process for Purification of Volatile Inorganic Hydrides, Amer. Chem. Soc., 6001 Chem. Abstracts, 114, Apr. 1991, 22, No. 16.
Tolmachev, A.M., et al., "Deep Purification of Hydrides by the Adsorption Method. I. Selectivity of Zeolites for Various Hydrides", Vysokochistye veshchestva 1988, No. 2, pp. 65-70, Dec. 1988.

* cited by examiner

*Primary Examiner*—Scott Kastler
(74) *Attorney, Agent, or Firm*—Geoffrey L. Chase

(57) ABSTRACT

Method for the purification of a volatile metal hydride comprising obtaining a volatile metal hydride feed containing one or more acidic impurities, one of which is a sulfur-containing impurity; contacting the feed with an alkaline material and reacting at least a portion of the sulfur-containing impurity with the alkaline material to remove a portion of the sulfur-containing impurity from the feed and provide an intermediate purified material, wherein the contacting of the feed with an alkaline material is effected at a sub-ambient temperature; and contacting the intermediate purified product with an adsorbent material to remove at least a portion of the sulfur-containing impurity from the intermediate purified material and provide a purified volatile metal hydride product.

7 Claims, 1 Drawing Sheet

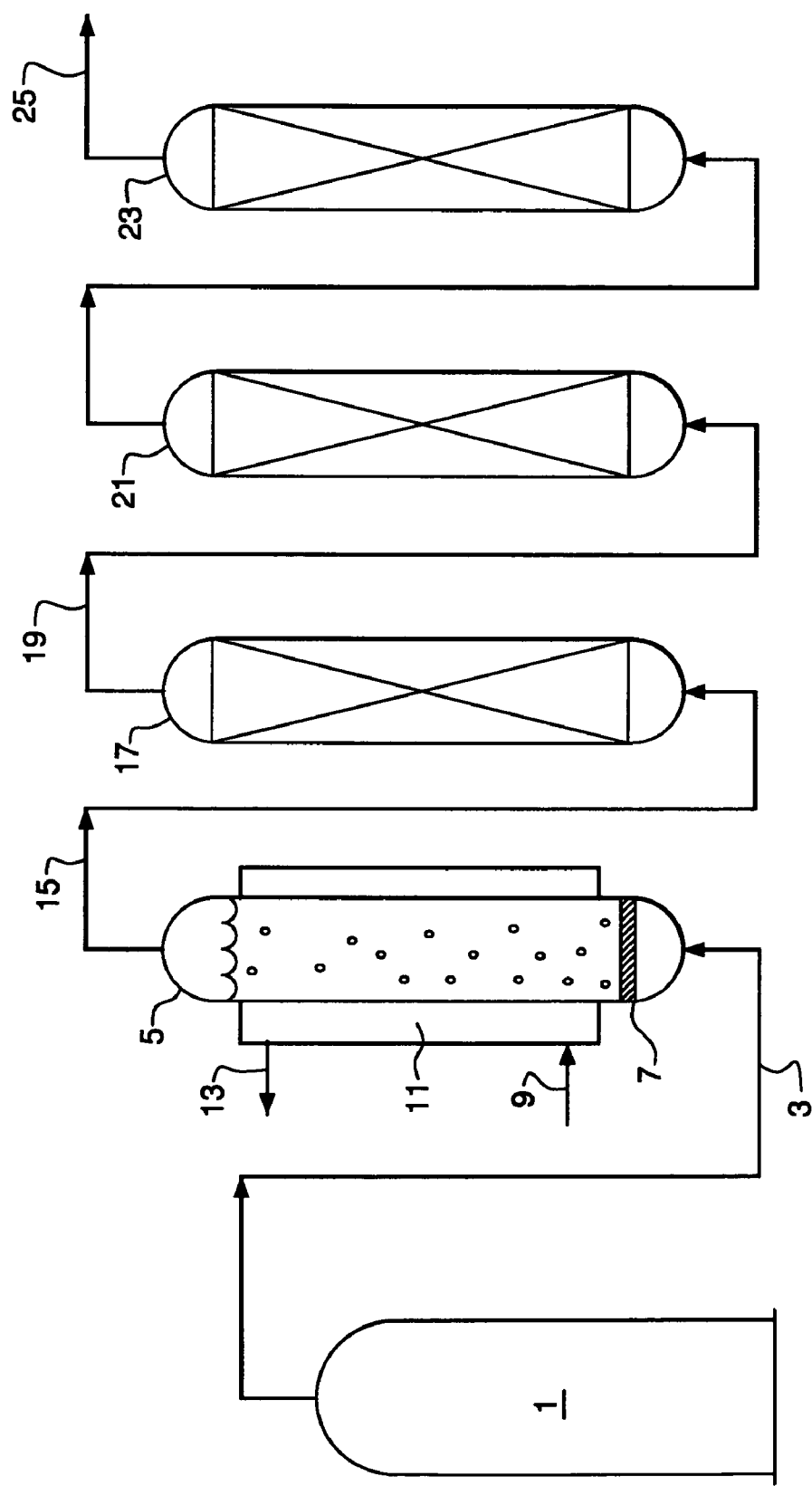

ed States Patent number omitted

REMOVAL OF SULFUR-CONTAINING IMPURITIES FROM VOLATILE METAL HYDRIDES

BACKGROUND OF THE INVENTION

Volatile metal hydride compounds are widely used as precursors in chemical vapor deposition (CVD) processes for the manufacture of microelectronic components. The growth and quality of thin metallic films formed from metal hydride precursors are highly dependent upon the purity of the precursor compounds and require extremely low concentrations of impurities, particularly volatile sulfur-containing impurities.

Purification of metal hydride compounds typically is effected in batch processes using purification media such as adsorbents, getters, and other reactive materials. When the purification media becomes spent as indicated by the initial breakthrough of impurities in the treated product, the process equipment is taken off line, disassembled to remove spent purification media, and reassembled with fresh purification media. Because volatile metal hydride compounds (for example, arsine and phosphine) are highly toxic, it is desirable to maximize the operating time between changes of the purification media in order to minimize purification media replacement and reduce potential hazards to operating personnel. Because the concentration of impurities in the raw feed material may vary significantly from batch to batch, it is also desirable to utilize purification processes that maintain high removal efficiencies regardless of fluctuations in the level of feed impurities.

As purity requirements for metal hydride precursors used in CVD processes become more stringent, there is a need for improved methods for removing impurities from precursor feed materials, particularly when the impurities include volatile sulfur compounds. These improved processes should reduce the potential for personnel exposure to the precursors and also allow for wide swings in impurity concentration levels in the feed materials. These needs are addressed by embodiments of the present invention described below and defined by the claims that follow.

BRIEF SUMMARY OF THE INVENTION

One embodiment of the present invention relates to a method for the purification of a volatile metal hydride comprising obtaining a volatile metal hydride feed containing one or more acidic impurities, one of which is a sulfur-containing impurity; contacting the feed with an alkaline material and reacting at least a portion of the sulfur-containing impurity with the alkaline material to remove a portion of the sulfur-containing impurity from the feed and provide an intermediate purified material, wherein the contacting of the feed with an alkaline material is effected at sub-ambient temperature; and contacting the intermediate purified product with an adsorbent material to remove at least a portion of the sulfur-containing impurity from the intermediate purified material and provide a purified volatile metal hydride product.

The volatile metal hydride feed also may contain an acidic impurity which does not contain sulfur. The acidic impurities may comprise hydrogen sulfide and carbon dioxide.

The volatile metal hydride feed typically comprises one or more compounds selected from the group consisting of arsine, phosphine, and germane.

The alkaline material may comprise one or more compounds selected from the group consisting of sodium hydroxide, potassium hydroxide, and tetraalkylammonium hydroxide.

The adsorbent material may comprise one or more adsorbents selected from the group consisting of type 4A zeolite, type 5A zeolite, type 13X zeolite, and activated alumina. The alkaline material may be an aqueous solution of one or more alkaline compounds. Optionally, the intermediate purified material may be contacted with a desiccant material prior to contacting with the adsorbent material.

Another embodiment of the invention includes a method for the purification of a volatile metal hydride comprising (a) obtaining a volatile metal hydride feed containing one or more acidic impurities, one of which is a sulfur-containing impurity;

(b) contacting the feed with an alkaline material and reacting at least a portion of the sulfur-containing impurity with the alkaline material to remove the portion of the sulfur-containing impurity from the feed and provide an intermediate purified material; and (c) contacting the intermediate purified material with an adsorbent material to remove at least a portion of the sulfur-containing impurity from the intermediate purified material and provide a purified volatile metal hydride product;

wherein the alkaline material is an aqueous solution of one or more alkaline compounds and wherein the alkaline material comprises one or more compounds selected from the group consisting of sodium hydroxide, potassium hydroxide, and tetraalkyl ammonium hydroxide. The intermediate purified material may be contacted. with a desiccant material prior to contacting with the adsorbent material.

BRIEF DESCRIPTION OF SEVERAL VIEWS OF THE DRAWINGS

The single FIGURE is a schematic flow diagram of a purification process according to an embodiment of the present invention.

DETAILED DESCRIPTION OF THE INVENTION

The removal of acidic and other impurities from volatile metal hydrides can be accomplished by adsorption of the contaminants on commercially-available adsorbents such as zeolites and activated aluminas. Adsorption is a well-known process for removing these contaminants, but several problems may be encountered which adversely affect the operation of the adsorption purification process, especially when extremely low impurity concentrations are required in the purified product. Volatile metal hydrides are toxic compounds and operators of adsorption purification systems are subject to potential exposure to these compounds when replacing spent adsorbents in these systems. In addition, the level of impurities in the crude volatile metal hydride feed material may fluctuate widely, and these fluctuations may have adverse effects on the adsorption system operation and final product purity.

It has been found that other impurities can be formed in adsorption processes if certain impurities are present in the crude volatile metal hydride feed material. For example, in the purification of arsine containing hydrogen sulfide and carbon dioxide as impurities by adsorption on zeolite adsorbents, hydrogen sulfide and carbon dioxide may react to form carbonyl sulfide and water. Since water is readily adsorbed on zeolites, the reaction is enhanced and more carbonyl sulfide is produced. This is problematic because carbonyl sulfide is another undesirable impurity in the purified arsine product. It also has been observed that small amounts of carbon monoxide may be formed when arsine decomposes to form small amounts of hydrogen and arsenic, and this hydrogen reacts with carbon dioxide in the presence of zeolite to form carbon monoxide. Carbon monoxide is another undesirable impurity in the purified arsine product.

Embodiments of the present invention address these problems by reducing the level of acidic impurities in the feed to the adsorption system by pretreating the crude volatile metal hydride feed material by contact with an alkaline media. This reduces the potential for the generation of other impurities in the adsorption process and increases the operating life of the adsorbent material. The alkaline pretreatment step may comprise contacting the volatile metal hydride feed material with an aqueous alkaline solution. In this and other embodiments, the alkaline pretreatment may be carried out at subambient temperatures in order to reduce the residual water content in the feed to the adsorption system. This also may enhance the capacity of the adsorbent for the contaminants by operating the adsorption step at a lower average temperature. Optionally, the pretreated feed may be dried by contact with a dessicant material prior to the adsorption step.

A volatile metal hydride is defined herein as any gaseous compound containing a metal moiety and an active hydride moiety. Volatile metal hydrides that may be purified using the method of the present invention include, but are not limited to, arsine, phosphine, and germane. Other volatile metal hydrides may be amenable to purification by the methods described herein.

An embodiment of the process is illustrated in the schematic flowsheet of the single FIGURE for the purification of crude arsine. Crude arsine in pressurized feed cylinder 1 is withdrawn via line 3 and introduced into alkaline contacting vessel 5. Contaminants in the crude arsine include at least one sulfur-containing contaminant, typically hydrogen sulfide (500 to 5,000 ppmv), and may contain carbon dioxide (100 to to 1,000 ppmv) and water (1,000 to 10,000 ppmv).

Typically, vessel 5 is filled with an alkaline material, which is defined as a compound or mixture of compounds capable of removing acidic impurities from a volatile metal hydride. For example, the alkaline material may be an aqueous solution of one or more soluble alkaline compounds at concentrations up to the solubility limit of these compounds at the operating temperature. The soluble alkaline compounds may be selected from sodium hydroxide, potassium hydroxide, tetraalkylammonium hydroxide, and mixtures thereof. The alkyl group in the tetraalkylammonium hydroxide may contain from one to four carbon atoms.

The feed may be distributed by distributor 7 and bubbled upward through the alkaline liquid wherein the acid components, for example, hydrogen sulfide and carbon dioxide, react to form soluble or insoluble compounds that remain in the alkaline solution. Optionally, vessel 5 may be cooled to subambient temperatures in the range of 0° C. to 20° C. by a recirculating coolant flowing through line 9, cooling system 11, and line 13. Alternatively or additionally, the feed in line 3 may be precooled by appropriate means.

Intermediate purified arsine is withdrawn via line 15 and contains reduced levels of contaminants, for example, 0 to 30 ppmv hydrogen sulfide, 0 to 100 ppmv carbon dioxide, and 1,000 to 5,000 ppmv water. The intermediate purified arsine optionally is introduced into drier vessel 17 filled with a solid dessicant such as, for example, anhydrous calcium sulfate, where water is removed to levels below about 100 ppmv. The dried intermediate purified arsine is withdrawn via line 19 and introduced into adsorber vessel 21 containing adsorbent material selected from type 4A zeolite, type 5A zeolite, type 13X zeolite, and activated alumina. An additional adsorber vessel 23, or additional adsorber vessels, may be used depending on the total adsorbent bed depth required for purification. Typically, a total bed depth of 2 to 10 m may be used and the volumetric residence time of the arsine may be in the range of 1 to 10 minutes. Purified arsine, typically containing less than ppbv hydrogen sulfide and 50 ppbv of other impurities, is withdrawn via line 25.

Alkaline solution in pretreatment vessel 5, desiccant material in drier vessel 17, and adsorbent material in vessels 21 and 23 may be replaced simultaneously or separately as required when the materials become spent, that is, when the materials no longer remove the respective impurities to the desired concentration levels. It may be desirable to utilize parallel purification trains so that one can be operated while the other is taken off line for replacement of purification media.

The following Examples illustrate the present invention but do not limit the invention to any of the specific details described therein.

EXAMPLE 1

A contaminated stream of arsine containing ~4,000 ppm of $H_2S$ was bubbled through a 5% dilute aqueous caustic stream at 18° C. and 15 psia at varying flow rates to determine the removal efficiency of $H_2S$ as a function of the flow rate. Flow rates during the tests were 44, 77 and 160 (lb/ft$^2$)/hr. Removal efficiencies were 99.99%, 99.95% and 99.75%, respectively, and the residual $H_2S$ concentrations in the purified arsine were 4.1, 7.2, and 14.3 ppmv, respectively.

EXAMPLE 2

Experiments were done to determine caustic scrubbing efficiency at 35.6° F. Arsine flow rate was maintained at 55 lbs/ft$^2$/hr using the same crude arsine as in Example 1. Removal efficiency for $H_2S$ was found to be 99.996%.

EXAMPLE 3

A contaminated stream of arsine containing ~4,000 ppm of $H_2S$ was bubbled through 5% caustic at 18° C. and 15 psia to determine the capacity of the caustic solution to remove hydrogen sulfide. Arsine flow rate was maintained at 58 (lb/ft$^2$)/hr. Purified arsine samples were taken regularly to determine residual $H_2S$ and its removal efficiency. Until the solution was fully exhausted, removal efficiency remained at >99.7%. A mass balance indicated that more than 11 g of $H_2S$ was removed from arsine by 12 g of NaOH, which compares with the theoretical removal efficiency of 10.2 g $H_2S$/12 g NaOH. Complete $H_2S$ breakthrough occurs only after the sodium hydroxide is fully exhausted.

EXAMPLE 4

Several crude arsine samples were analyzed to determine the concentration of volatile sulfur species. In all the samples, concentrations of greater than 100 ppmv $H_2S$ were measures but no COS was detected. These data indicate that COS is not formed during the production of arsine.

EXAMPLE 5

Several arsine samples were purified using adsorption beds containing Type 4A zeolite, type 5A zeolite, or Selexorb type COS (an activated alumina made by Alcoa) and the purified arsine product was analyzed for volatile sulfur species at regular intervals. Carbonyl sulfide was detected in the purified arsine effluent much earlier than hydrogen sulfide was detected. This indicated that carbonyl sulfide is formed on the adsorbent while moisture is removed. Removal of hydrogen sulfide and/or carbon dioxide from the crude arsine by alkaline scrubbing prior to adsorption will prevent formation of carbonyl sulfide, which is not effectively removed during the adsorption purification process.

EXAMPLE 6

Experiments were done to determine the impact of caustic scrubbing on the life of an adsorption bed used for final purification of arsine. A control experiment was done initially without caustic scrubbing in which the crude arsine of Example 1 was passed through a bed of type 4A zeolite at a flow rate of 50 $(lb/ft^2)/hr$. COS breakthrough was noted after 3 g arsine/g adsorption media had been processed. Experiments then were carried out in which the crude arsine was passed through a caustic scrubber and bed of adsorption media in series using the same mass of adsorption media used in the control experiment. COS breakthrough was noted after 48 g arsine/g adsorption media had been processed.

The invention claimed is:

1. A method for the purification of a volatile metal hydride comprising
    (a) obtaining a volatile metal hydride feed containing one or more acidic impurities, one of which is a sulfur-containing impurity;
    (b) contacting the feed with an alkaline material and reacting at least a portion of the sulfur-containing impurity with the alkaline material to remove the portion of the sulfur-containing impurity from the feed and provide an intermediate purified material, wherein the contacting of the feed with an alkaline material is effected at a sub-ambient temperature; and
    (c) contacting the intermediate purified material with an adsorbent material to remove at least a portion of the sulfur-containing impurity from the intermediate purified material and provide a purified volatile metal hydride product.

2. The method of claim 1 wherein the volatile metal hydride feed contains an acidic impurity which does not contain sulfur.

3. The method of claim 2 wherein the acidic impurities comprise hydrogen sulfide and carbon dioxide.

4. The method of claim 1 wherein the volatile metal hydride feed comprises one or more compounds selected from the group consisting of arsine, phosphine, and germane.

5. The method of claim 1 wherein the adsorbent material comprises one or more adsorbents selected from the group consisting of type 4A zeolite, type 5A zeolite, type 13X zeolite, and activated alumina.

6. A method for the purification of a volatile metal hydride comprising
    (a) obtaining a volatile metal hydride feed containing one or more acidic impurities, one of which is a sulfur-containing impurity;
    (b) contacting the feed with an alkaline material and reacting at least a portion of the sulfur-containing impurity with the alkaline material to remove the portion of the sulfur-containing impurity from the feed and provide an intermediate purified material; and
    (c) contacting the intermediate purified material with an adsorbent material to remove at least a portion of the sulfur-containing impurity from the intermediate purified material and provide a purified volatile metal hydride product;
wherein the alkaline material is an aqueous solution of one or more alkaline compounds and wherein the alkaline material comprises one or more compounds selected from the group consisting of sodium hydroxide, potassium hydroxide, and tetraalkyl ammonium hydroxide.

7. The method of claim 6 wherein the intermediate purified material is contacted with a desiccant material prior to contacting with the adsorbent material.

* * * * *